United States Patent
Xu et al.

(10) Patent No.: US 12,039,027 B1
(45) Date of Patent: Jul. 16, 2024

(54) EVALUATING BIOMETRIC AUTHORIZATION SYSTEMS WITH SYNTHESIZED IMAGES

(71) Applicant: Amazon Technologies, Inc., Seattle, WA (US)

(72) Inventors: Xiang Xu, New Hyde Park, NY (US); Hao Zhou, Seattle, WA (US); Jonathan Wu, Seattle, WA (US); Joseph P Tighe, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 295 days.

(21) Appl. No.: 17/709,262

(22) Filed: Mar. 30, 2022

(51) Int. Cl.
*G06F 21/32* (2013.01)

(52) U.S. Cl.
CPC .................. *G06F 21/32* (2013.01)

(58) Field of Classification Search
CPC ....................................... G06F 21/32
See application file for complete search history.

(56) References Cited

U.S. PATENT DOCUMENTS

| | | |
|---|---|---|
| 10,951,958 B1 | 3/2021 | Arana et al. |
| 11,023,618 B2 | 6/2021 | Berman |
| 2013/0010095 A1 * | 1/2013 | Aoki .............. H04N 23/611 382/103 |
| 2019/0377934 A1 * | 12/2019 | Tseng .............. G06V 40/168 |
| 2021/0042397 A1 | 2/2021 | Ur |
| 2021/0117721 A1 * | 4/2021 | Hall .............. G06V 40/1376 |
| 2021/0174487 A1 | 6/2021 | Nie ner et al. |
| 2021/0209388 A1 | 7/2021 | Ciftci et al. |
| 2022/0012171 A1 * | 1/2022 | Zheng ............ G06F 11/3692 |

* cited by examiner

*Primary Examiner* — Bryan Y Lee
(74) *Attorney, Agent, or Firm* — Robert C. Kowert; Kowert, Hood, Muyon, Rankin & Goetzel, P.C.

(57) ABSTRACT

A system for evaluating a biometric authorization system is described. The biometric authorization system is configured to apply a facial recognition model to image data to make an authorization determination based on detection of synthesized image data and based on matching a reference image to the image data. The system is also configured to execute one or more synthetic image data attack protocols to evaluate the biometric authorization system. The system also generates, according to one or more synthetic image data generation techniques, an evaluation set of image data comprising synthesized representations of a target and sends one or more authorization requests using the evaluation set of image data to the biometric authorization system. The system generates an evaluation of the biometric authorization system for synthetic image data attack analysis based on respective responses to the one or more authorization requests received from the biometric authorization system.

20 Claims, 13 Drawing Sheets

EVALUATING BIOMETRIC AUTHORIZATION SYSTEMS WITH SYNTHESIZED IMAGES

BACKGROUND

Computing devices can be secured from unauthorized access by implementing authorization systems. Modern devices may include biometric authorization systems that are based on one or more of fingerprint recognition or facial recognition. The biometric authorization systems are intended to be secured based on only one person having the requisite biometric markers that are used in securing the devices. However, malicious actors may synthesize biometric data to gain unauthorized access.

Synthesized images and videos, including DeepFake videos, have become increasingly common. The synthesized images and videos have improved in visual fidelity to where biometric authorization systems have been tricked into granting access despite the biometric markers not being physically present with the device.

Figure 1:
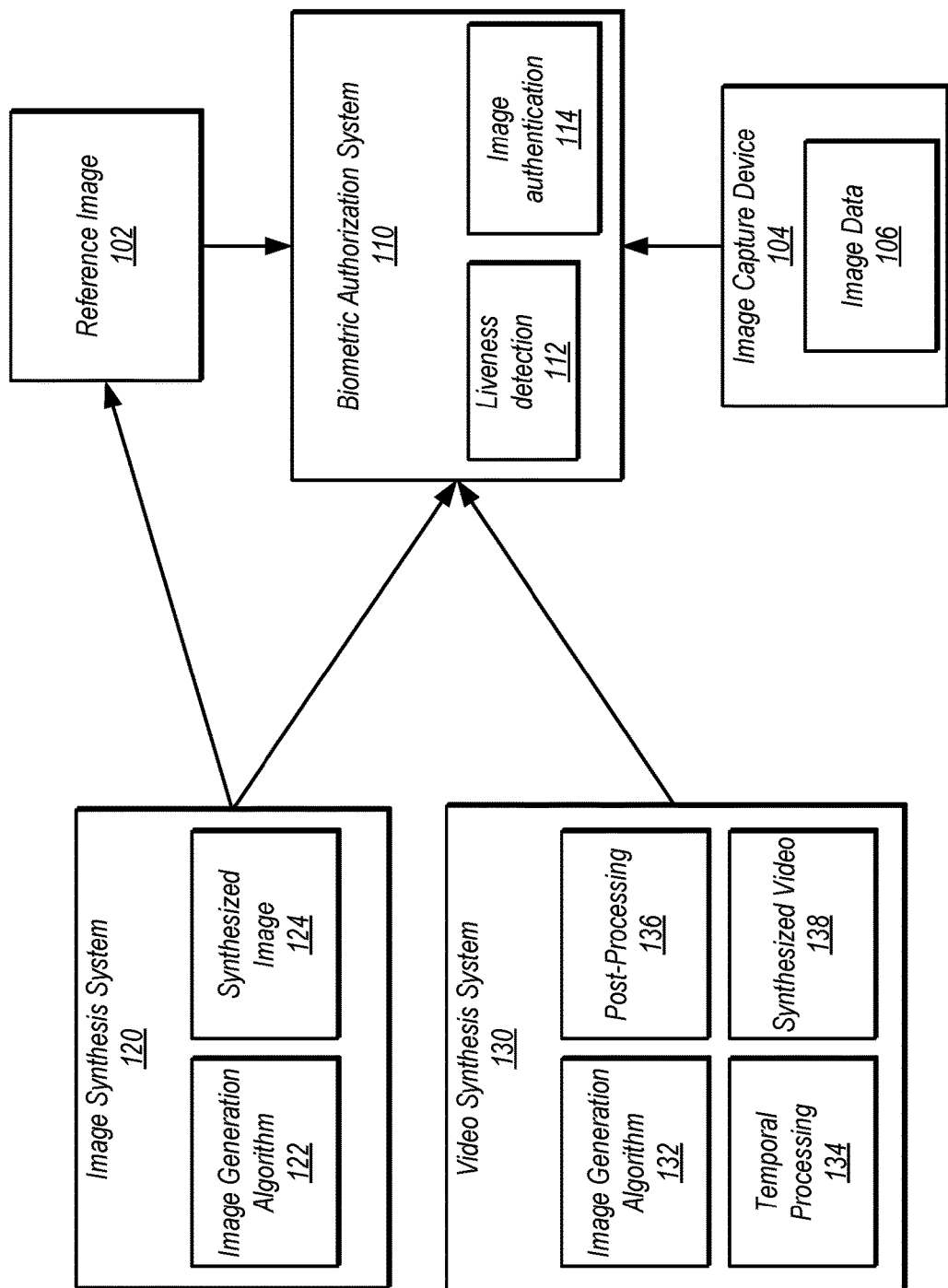
FIG. 1 is a block diagram depicting a system for synthesizing images or videos for evaluating biometric authorization systems, according to various embodiments.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

DETAILED DESCRIPTION

Various systems and methods for evaluating security of biometric authorization systems are described herein. A biometric authorization system may include one or more sensors configured to capture physical characteristics of a target for authorization. The target may be a user of a device or an account. The target may be authenticated based on the physical characteristics and a reference set of characteristics. In some embodiments, the reference set of characteristics may include facial features, fingerprints, voiceprints, or other unique characteristics relating to the target.

In implementations where the biometric authorization system is configured for facial recognition, the biometric authorization system may compare a reference image of the target with a live captured image of the target. The reference image may be a previously captured image of the target during an onboarding or setup process. An image capture device, such as a camera, may be configured to capture images, including the image of the target. Based on a determination that the target in the captured image is a match with the target in the reference image, the biometric authorization system may authenticate the target to grant access to the device or the account.

Some systems may include a light pattern detection system configured to determine that an image is authentic based on particular light patterns being projected onto the target. A display device or light projection device may project a light pattern that includes an arrangement of colors and shapes onto the target. The image capture device may capture an image while the light pattern is projected.

Computer vision algorithms may be configured to synthetically generate light patterns such that a synthetized light pattern may be overlaid on a fake image. The synthesized light pattern may be applied to deceive the biometric authorization system into accepting the fake image for authorization of the target. The light pattern detection system may analyze the image to detect the light pattern and determine whether the light pattern in the image is a genuine representation of the light pattern.

A malicious actor may inject synthesized images in place of captured images. The synthesized images may be generated based on machine learning algorithms. The synthesized images may be colloquially referred to as "deepfakes." The biometric authorization system may incorrectly consider that the synthesized image is a match with the reference image by initially being unable to detect that the synthesized image is in fact synthesized and not an actual photo of the target captured by the camera.

An image synthesis system may be configured to generate a synthesized image or video of the target to train the biometric authorization system to better recognize synthesized images and videos. The biometric authorization system may be configured to generate a synthesis score based on analyzing a synthesized image in comparison to the reference image. The synthesis score may indicate the likelihood that the synthesized image is in fact synthesized. Additional metrics may include metrics indicating one or more of a false acceptance rate, a false rejection rate, a false match rate, and a false non-match rate. In some situations, the synthesis score may be based at least in part on the false rejection rate may be used in combination with the false acceptance rate at a particular rate such that two metrics.

The image synthesis system may have an image synthesis pipeline, a video synthesis pipeline, or both. The image synthesis pipeline may include one or more image generation algorithms, such as neural network-based or machine learning-based algorithms. The video synthesis pipeline may also include one or more image generation algorithms in combination with temporal consistency algorithms.

The biometric authorization system may be initially unaware that the synthesized image or video is synthesized prior to determining that the synthesized image or video corresponds to the reference image. The biometric authorization system may attempt to validate the synthesized image or video against the reference image and generate an output that indicates a validation status and a synthesis score. Input images or videos may be determined to be synthesized based on the synthesis score satisfying certain thresholds. The thresholds may be based on tolerances according to the metrics described above.

In one aspect, a system is described. The system may include one or more processors and a memory storing program instructions. When the program instructions are executed by the one or more processors, cause the one or more processors to perform operations. The operations may include obtaining image data submitted to a biometric authorization system that applies facial recognition techniques to the image data to make an authorization determination. The operations may also include applying a detection model to the image data to generate an image synthesis score for the image data, wherein the detection model is trained to detect synthesized image data according to a light pattern projected onto a target during image data capture. The operations may also include classifying the image data as fake according to the image synthesis score. The operations may further include making the authorization determination for the image data according to the classification of the image data as fake.

In another aspect, a method is described. The method may include receiving, at a biometric authorization system, image data depicting a target. The method may also include generating an image synthesis score for the image data according to a detection model, wherein the detection model is trained to detect synthesized image data according to a light pattern projected onto the target. The method may further include classifying the image data according to the image synthesis score. The method may also include making the authorization determination for the image data according to the classification of the image data.

In yet another aspect, one or more computer-readable storage media storing instructions are described. The instructions, when executed on or across one or more processors, cause the one or more processors to perform operations. The operations may include obtaining image data submitted to a biometric authorization system. The operations may further include generating an image synthesis score for the image data according to a detection model, wherein the detection model is trained to detect synthesized image data according to a light pattern projected onto a target. The operations may further include classifying the image data according to the image synthesis score. The operations may also include making the authorization determination for the image data according to the classification of the image data.

In one aspect, a system is described. The system may include a biometric authorization system configured to apply a facial recognition model to image data to make an authorization determination based on detection of synthesized image data and based on matching a reference image to the image data. The system may also include one or more processors and a memory configured to store instructions. The instructions, when executed on or across the one or more processors, cause the one or more processors to perform operations. The operations may include executing one or more synthetic image data attack protocols to evaluate the biometric authorization system. The one or more synthetic image data attack protocols further cause the one or more processors to generate, according to one or more synthetic image data generation techniques, an evaluation set of image data comprising synthesized representations of a target and send one or more authorization requests using the evaluation set of image data to the biometric authorization system. The operations further include generating an evaluation of the biometric authorization system for synthetic image data attack analysis based, at least in part, on respective responses to the one or more authorization requests received from the biometric authorization system.

In another aspect, a method is described. The method may include identifying a biometric authorization system for synthesized image data attack analysis, wherein the biometric authorization system analyzes reference image data to make an authorization determination. The method may also include executing one or more synthetic image data attack protocols to evaluate the biometric authorization system. The one or more synthetic image data attack protocols may include generating, according to one or more synthetic image data generation techniques, an evaluation set of image data and sending one or more authorization requests using the evaluation set of image data to the biometric authorization system. The method may also include generating an evaluation of the biometric authorization system for synthetic image data attack analysis based, at least in part, on respective responses to the authorization requests received from the biometric authorization system.

In yet another aspect, one or more computer-readable storage media storing instructions are described. The instructions, when executed on or across one or more processors, cause the one or more processors to perform operations. The operations may include identifying a biometric authorization system for synthesized image data attack analysis, wherein the biometric authorization system analyzes reference image data to make an authorization determination. The operations may also include executing one or more synthetic image data attack protocols to evaluate the biometric authorization system. The one or more synthetic image data attack protocols further cause the one or more processors to generate, according to one or more synthetic image data generation techniques, an evaluation set of image data and send one or more authorization requests using the evaluation set of image data to the biometric authorization system. The operations may further include generating an evaluation of the biometric authorization system for synthetic image data attack analysis based, at least in part, on respective responses to the authorization requests received from the biometric authorization system.

FIG. 1 is a block diagram depicting a system 100 for synthesizing images or videos for evaluating biometric authorization systems, according to various embodiments. The system 100 may include a biometric authorization system 110, an image synthesis system 120, and a video synthesis system 130, according to some embodiments.

The biometric authorization system 110 may be configured to authorize access to a device or service based on stored biometric data compared against live-captured biometric data, according to some embodiments. For example, the biometric authorization system 110 may have access to reference images for various target individuals, such as reference image 102 for a given target. In some embodiments, the target may be a user or an individual that has authorization to access the device or service managed by the biometric authorization system 110. The reference image 102 may include one or more of a photograph of the target, a 3D map of the target, a representation of a fingerprint of the target, or any other representation of biometric data for the target, in various embodiments. In some embodiments, current live-captured images of the target may be obtained from image capture device 104. For example, the image capture device 104 may include a camera configured to capture image data 106 including photographic images or videos of an environment in front of a device. For example, in situations where the reference image 102 is a photograph of the target, the reference image 102 may be compared against the image data 106 that may include a captured image or a captured video of the target captured via the image capture device 104. The image data 106 of the target may be captured by the image capture device 104 in response to a request to authorize the target in accordance with the biometric authorization system 110.

The system 100 may be configured to capture the reference image 102 with the image capture device 104 during an onboarding or setup process, according to some embodiments. For example, the target may establish an account or secured permissions by requesting to be added to the biometric authorization system 110. The biometric authorization system 110 may configure the image capture device 104 to capture the image data 106 including a photographic image of the target, three-dimensional (3D) representation of the target, or a video of the target to be stored as the reference image 102.

The biometric authorization system 110 may require that the image capture device 104 be called on-demand such that a previously captured image is disallowed from being used in comparison with the reference image 102. For example, previously captured images older than a threshold time period may be rejected by the biometric authorization system 110 as being stale or too old. Enforcing the threshold time period may maintain one level of integrity of the biometric authorization system 110 such that a malicious actor can use a stored image to bypass the biometric authorization system 110.

Although the biometric authorization system 110 is configured to require a live-captured image or video from the image capture device 104, the biometric authorization system 110 may be refined to be resilient against malicious attacks. Examples of the malicious attacks may include loading previously captured images or injection of synthesized images, such as DeepFakes. As described above, the biometric authorization system 110 may enforce time limits to mitigate use of previously captured images such that a stored photo cannot be reused during authorization.

The biometric authorization system 110 may be configured to implement liveness detection 112 and image authentication 114, according to some embodiments. Liveness detection 112 may be configured to determine whether input images, such as one or more of the reference image 102 or the image data 106, are images of actual people. In some embodiments, the liveness detection 112 may include facial recognition models configured to determine whether a photo depicts a human face or a generated face that looks like a human face. Image authentication 114 may be configured to determine whether the input images, such as the image data 106, is authenticated with respect to the reference image 102, according to some embodiments. In some embodiments, the image authentication 114 may include facial recognition models configured to determine that faces depicted in image data are similar.

The biometric authorization system 110 may be configured to test the liveness detection 112 and the image authentication 114 based on one or more synthetic image data attack protocols, according to some embodiments. The synthetic image data attack protocols may include attacks that include replacement of one or more of the reference image 102 or the image data 106 with synthesized image data, according to some embodiments. For example, the reference image 102 may be subject to an attack protocol where a synthesized image of a target individual replaces the reference image 102. As another example, the image data 106 may be subject to an attack protocol where a synthesized image or synthesized video of the target individual replaces the image data 106. Another example attack protocol may include both the reference image 102 being replaced by a synthesized image and the image data 106 being replaced by another synthesized image or a synthesized video.

The biometric authorization system 110 may be configured to detect that a synthesized image, such as synthesized image 124, has been injected into the pipeline, according to some embodiments. For example, the malicious actor may have intruded on communications between the image capture device 104 and the biometric authorization system 110 such that the malicious actor is able to trick or mislead the biometric authorization system 110 into accepting the synthetic image as if it were properly captured image data 106 from the image capture device 104. The biometric authorization system 110 may be configured to detect synthesized images to mitigate false acceptances of synthesized images.

The biometric authorization system 110 may be trained to detect synthesized images based on the system 100 generating synthesized images and utilizing machine learning models to detect subsequent synthesized images, according to some embodiments. The system 100 may include an image synthesis system 120 configured to generate synthesized images, such as a synthesized image 124. The image synthesis system 120 may include an image generation algorithm 122, according to some embodiments. In other embodiments, the image synthesis system 120 may include multiple image generation algorithms 122. In some embodiments, the image generation algorithm 122 may include one or more machine learning networks, such as a generative adversarial network (GAN), configured to generate content. For example, the one or more machine learning networks may include machine learning models configured to generate images of targets, such as individuals or people. In some embodiments, the machine learning networks may generate the images of targets based on one or more source images. For example, the one or more source images may be combined or modified to generate a new image of an individual that might not necessarily exist in real life. As another example, multiple images from the image data 106 may be combined and altered to generate the synthesized image 124.

The image synthesis system 120 may be configured to receive input configuration parameters that define the desired output synthesized image 124 of the input synthesis system 120, according to some embodiments. For example, the configuration parameters may indicate that a particular target is to be synthesized. As another example, the configuration parameters may include a level of noise to apply to the synthesized image 124. Other configuration parameters may include an indication of which machine learning network, such as a particular GAN or a version of a GAN, to apply. Another configuration parameter may include an indication that multiple machine learning networks are to be used to generate the synthesized image 124. Yet another configuration parameter may be set to indicate that different random seeds are to be applied to the machine learning networks.

A video synthesis system 130 may be configured to generate a synthesized video 138, according to some embodiments. The video synthesis system 130 may include an image synthesis system 132, in some embodiments. In other embodiments, the video synthesis system 130 may invoke the image synthesis system 120 as an external system. In yet other embodiments, the image synthesis system 120 may be incorporated as the image synthesis system 132. The image synthesis system 132 may be configured to generate a synthesized image of the target as depicted in the reference image 102. In some embodiments, the image synthesis system 132 may be configured similarly to the image synthesis system 120, as described above. In some embodiments, the video synthesis system 130 may be configured to generate the synthesized video 138 based on an existing image of a particular individual. For example, the video synthesis system 130 may generate the synthesized video 138 of a targeted individual based on an existing image of the targeted individual, such as the reference image 102 or other stored images of the targeted individual.

In some embodiments, the video synthesis system 130 may receive a video of a different individual to be overlaid with synthesized images of the target. For example, the video synthesis system 130 may receive a source video from the image capture device 104 that has been intercepted to be replaced prior to providing a video to the biometric authorization system 110, such as a video represented by the image data 106. In some embodiments, the video synthesis system 130 may be configured to modify video represented by the image data 106 with the synthesized image to generate a modified video, such as the synthesized video 138, that has a synthesized representation of the targeted individual.

The image synthesis system 132 of the video synthesis system 130 may be configured to generate a synthesized image of the target, according to some embodiments. The synthesized image may be processed by temporal processing 134 to introduce movement over time. For example, temporal processing 134 may animate the synthesized image to be overlaid on the source video to appear as if the source video captured the targeted individual instead of the different individual. In some embodiments, temporal processing 134 may include blending or fusion techniques to depict motion over time.

The video synthesis system 130 may include post-processing 136 for visual fidelity improvements of the synthesized video 138. For example, the post-processing 136 may include one or more video editing techniques that reduce elements that cause the synthesized video 138 to appear uncanny or unrealistic. As another example, the post-processing 136 may include one or more filters to make the synthesized video 138 appear more lifelike than the synthetic image on its own.

Lighting in images can be a distinguishing feature in determining whether an image is authentic or digitally reproduced. Unnatural lighting may indicate to a human viewer or a computer image processing system that at least a portion of an image has been digitally altered. In some embodiments, the post-processing 136 may include lighting effects that are applied to the synthesized video 138 to improve visual fidelity. For example, the lighting effects may include increasing or decreasing brightness of at least a portion of the synthesized video 138 to give the appearance of ambient light in the environment of the synthesized video 138. In some embodiments, the post-processing 136 may analyze the captured video 118 to determine the lighting effects to apply to the synthesized video 138. For example, the post-processing 136 may determine lighting opacity, angles, colors, or other characteristics to be applied to have synthesized portions of the synthesized video 138 appear as if they are physically in the environment of the captured video 118.

The video synthesis system 130 may provide the synthesized video 138 to the biometric authentication system 110, according to some embodiments. The biometric authorization system 110 may receive the synthesized video 138 and perform various tasks based on the synthesized video 138. In some embodiments, the system 100 may lower security requirements as part of a testing procedure, as described herein. The biometric authorization system 110 may be tested by being provided the synthesized image 124 or the synthesized video 138, as described herein.

The synthesized image 124 or the synthesized video 138 may be sent to the biometric authorization system 110 as part of a training process, according to some embodiments. For example, the biometric authorization system 110 may be provided the synthesized image 124 or the synthesized video 138 to be compared against the reference image 102. The biometric authorization system 110 may attempt the comparison while treating the synthesized image 124 or the synthesized video 138 as a legitimately acquired captured image 116 or captured video 118 from the image capture device 104. In some embodiments, the biometric authorization system 110 may be configured to detect whether the synthesized image 124 or the synthesized video 138 are likely to be synthesized and not likely to be legitimately captured images or videos.

Liveness detection 112 may receive one or more of the synthesized image 124 or the synthesized video 138 as part of an attack protocol, according to some embodiments. For example, an attack protocol may include injecting the synthesized image 124 in place of the reference image 102. As another example, another attack protocol may include injecting the synthesized image 124 or the synthesized video 138 in place of the image data 106 from the image capture device 104. In some situations, an attack protocol may include both replacement of the reference image 102 and the image data 106 with one or more of the synthesized image 124 and the synthesized video 138. In some embodiments, the liveness detection 112 may include one or more detection models configured to apply machine learning networks to determine whether an image has been synthetically generated, such as a DeepFake image or video. Based on a determination by the liveness detection 112 that an input image is synthetically generated, the biometric authorization system 110 may make an authorization determination to reject the authorization request. In some situations, the liveness detection 112 may not make the determination with a threshold certainty level such that the liveness detection 112 is unable to determine with certainty that the input image is synthetically generated. The liveness detection 112 may indicate a score that represents the likelihood that the input image was synthetically generated such that an authorization tool or administrator may determine whether the liveness detection 112 should be trained in a manner to detect the input image as either synthetically generated or authentically captured.

Image authentication 114 may receive the synthesized image 124 or the synthesized video 138 in place of the reference image 102 or the image data 106 based on one or more attack protocols, according to some embodiments. In situations in which the liveness detection 112 determined that the input images are not synthetically generated or in situations where the liveness detection 112 was unable to determine that the input images are synthetically generated with a threshold level of certainty, the image authentication 114 may proceed to determine whether the input images correspond to the reference image 102 for a given target.

The image authentication 114 may receive input image data, according to some embodiments. The image authentication 114 is not necessarily aware that the input image data is which type of image data from the synthesized image 124, the synthesized video 138, or the image data 106. In some embodiments, the image authentication 114 may be configured to use one or more facial recognition techniques to determine whether a face depicted in the input image data and the reference image 102 belongs to the same target, such as the same person or individual.

The biometric authorization system 110 may maintain metrics in response to testing the attack protocols, according to some embodiments. For example, a testing process for the biometric authorization system 110 may include generating a similarity score between the input images and the reference image 102. The similarity score may indicate multiple metrics based on comparing an input image or video with the reference image 102, according to some embodiments. For example, the metrics may indicate one or more of a false acceptance rate ("FAR"), a false rejection rate ("FRR"), a false match rate ("FMR"), a false non-match rate ("FNMR"), or a combination thereof. The false acceptance rate may indicate a rate of synthesized images or videos being incorrectly accepted by the biometric authentication system 110 for comparisons against the reference image 102. The false rejection rate may indicate a rate of legitimately captured images or videos being incorrectly rejected by the biometric authentication system 110 for comparisons against the reference image 102. The false match rate may indicate a rate of synthesized images or videos being incorrectly matched with the reference image 102 by the biometric authentication system 110. The false non-match rate may indicate a rate of legitimately captured images or videos being incorrectly unmatched with the reference image 102 by the biometric authentication system 110. In some embodiments, a combination of metrics may include adjusting the false rejection rate when the false acceptance rate is a set value. This specific combination may be expressed as FRR@FAR=X, where X is a specified rate for the FAR metric. In some embodiments, lowering each of these metrics may optimize the liveness detection 112 or the image authentication 114.

Training the liveness detection 112 or the image authentication 114 may result in adjustments of the multiple metrics such that subsequent actions by the biometric authentication system 110 may be improved to better detect actual images and videos compared with synthesized images and videos. The liveness detection 112 or the image authentication 114 may also be configured to detect when the reference image 102 has been synthesized. For example, the liveness detection 112 or the image authentication 114 may detect not only that the input image or video is synthesized but that the reference image 102 is also synthesized.

The biometric authorization system 110 may be configured to detect synthesized images being received to be the reference image 102, according to some embodiments. For example, the biometric authorization system 110 may receive the synthesized image 124 as an input image from the image synthesis module 120 or a malicious actor or user. Prior to determining whether the input image matches the reference image 102, the biometric authorization system 110 may be configured to determine whether the input image is synthesized and not an organically captured image. In other embodiments, the biometric authorization system 110 may be configured to determine whether an input video is synthesized and not an organically captured video. In some embodiments, the biometric authorization system 110 may indicate a score indicating a likelihood that the input image or video has been synthesized and is not genuine. Although the score may indicate that the input image or video is likely to have been synthesized, the biometric authorization system 110 may continue to determine whether the input image or video matches the reference image 102. For example, the biometric authorization system 110 may continue in the event that the input image or video was falsely determined to have been synthesized such that the false determination may be rectified in subsequent iterations of the biometric authorization system 110.

In situations where the reference image 102 is authentic and the synthesized image 124 or the synthesized video 138 is provided to the biometric authorization system 110 as an input image or video, the biometric authorization system 110 may attempt to determine whether the input image or video is synthesized or legitimate. Based on a determination that the image input or video is synthesized, the biometric authorization system 110 may reject the input image or video. In some situations, the biometric authorization system 110 may indicate that the input image or video is tentatively considered to be synthesized while also continuing to compare the input image or video to the reference image 102.

Figure 2:
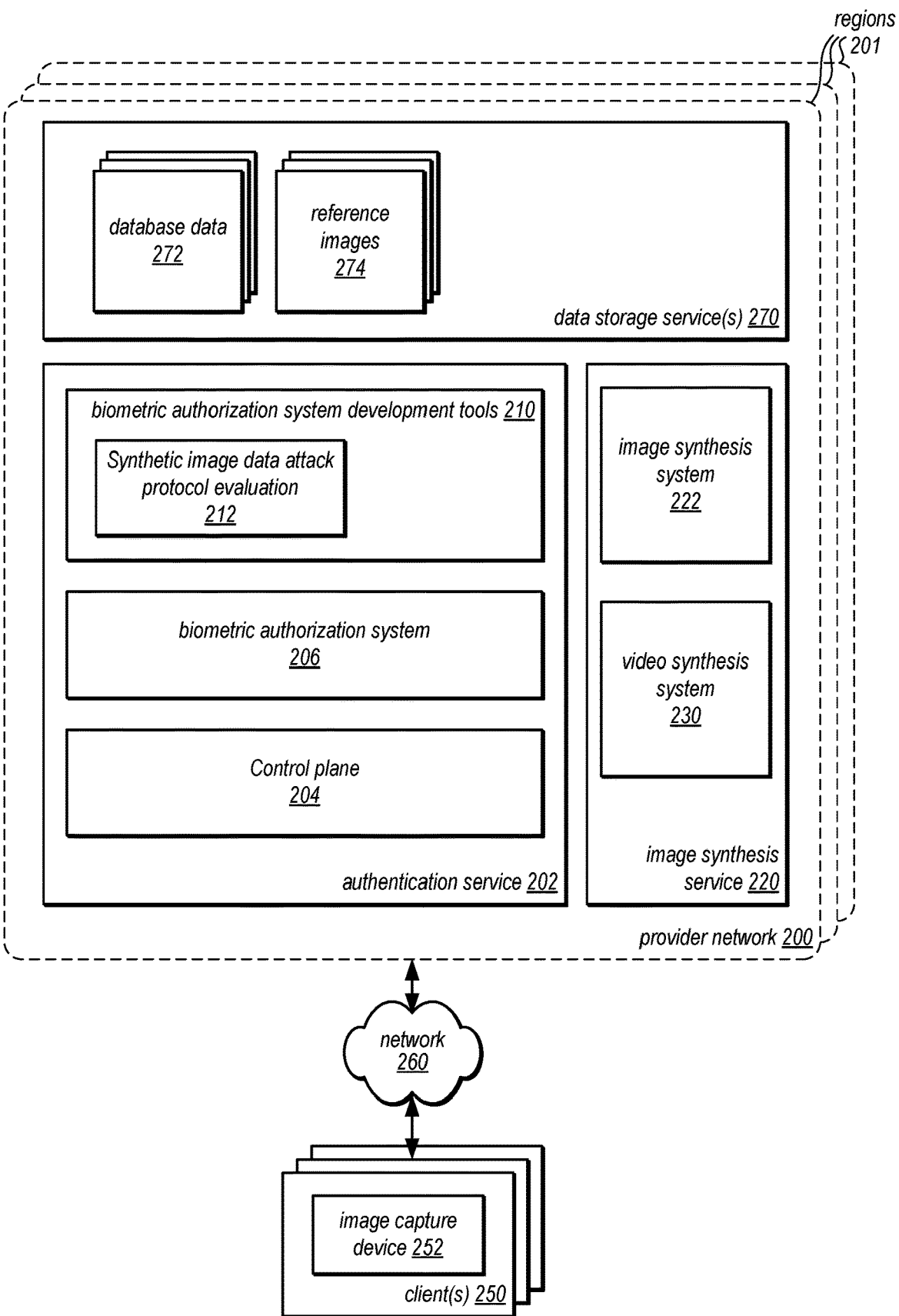
FIG. 2 illustrates a provider network configured to provide services to clients via a network, according to some embodiments.

FIG. 2 illustrates a provider network 200 configured to provide services to clients via a network, according to some embodiments. The provider network 200 may be implemented on or across multiple regions 201. The regions 201 may be geographical regions or logical regions that separate computing resources. The provider network 200 may be configured to provide an authentication service 202 to clients 250 via a network 260. The authentication service 202 may be configured to manage secured access to one or more downline services, such as data storage service 270.

The authentication service 202 may include a control plane 204, a biometric authorization service 206, biometric authorization system development tools 210, an image synthesis service 222, and data storage service(s) 270, according to some embodiments. In some embodiments, the clients 250 may request authorization to access the data storage service 270. For example, the clients 250 may seek to access database data 272 in the data storage service. In some embodiments, the authentication service 202 may be configured to authorize or deny the clients 250 from accessing the database data 272 in accordance with the biometric authorization service 206. For example, the database data 272 may be held in a secure storage location in the data storage service 270. As another example, the database data 272 may be restricted to particular users or accounts that have permission to access the database data 272.

The biometric authorization service 206 may be configured to compare reference images 274 of target individuals against live-captured images or videos, according to some embodiments. The clients 250 may include or be coupled to respective image capture devices 252 configured to capture images or videos of users of the clients 250. For example, the image capture device 252 may include a camera device configured to capture the images or videos of the users. The biometric authorization service 206 may retrieve the reference images 274 from the data storage service 270 in response to a request for a particular client of the clients 250. In some embodiments, the authentication service 202 may be configured to cache the reference images 274 for the biometric authorization service 206.

The authentication service 202 may be configured to invoke an image synthesis service 220 that includes an image synthesis service 222 and a video synthesis system 230, according to some embodiments. The image synthesis service 222 may be configured to generate synthesized images of target individuals to be provided to the authentication service 202. The video synthesis system 230 may be configured to generate synthesized videos of the target individuals to be provided to the authentication service 202. The image synthesis service 220 may provide the synthesized image or video to the authentication service 202 as part of a synthesis detection process.

Biometric authorization system development tools 210 may be configured to train the biometric authorization system 206 to determine whether input images or videos provided to the authentication service 202 are likely to be synthesized, according to some embodiments. The biometric authorization system development tools 210 may include one or more machine learning networks configured to determine whether an image or video is likely to be synthesized or not an actual image or video of a target individual in accordance with a synthetic image data attack protocol evaluation 212. The synthetic image data attack protocol evaluation 212 may be configured to output a synthesis score that indicates a likelihood that the input image or video is synthesized or properly captured.

The synthetic image data attack protocol evaluation 212 may be trained based on synthesized images and videos provided by the image synthesis system 222. For example, the image synthesis system 222 may indicate that a given image is a synthesized image such that the synthetic image data attack protocol evaluation 212 may attempt to determine whether the given image is synthesized and be adjusted based on an indication as to the given image is a synthesized image.

Figure 3:
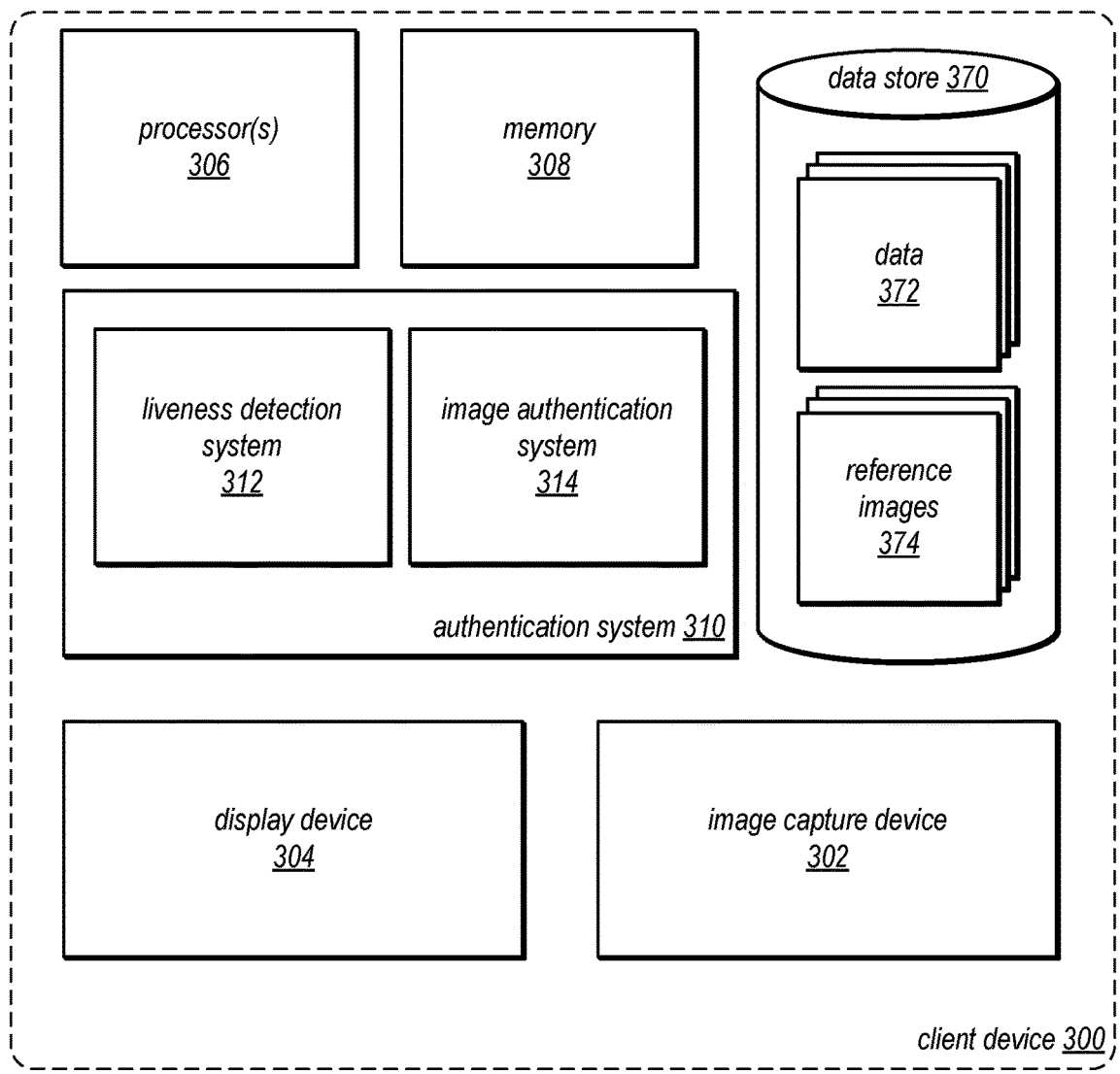
FIG. 3 illustrates a client device configured to authenticate a user of the device, according to some embodiments.

The trained biometric authorization system 206 may be implemented for use by the authentication service 202, according to some embodiments. In other embodiments, the trained biometric authorization system 206 may be provided to other devices or services for deployment in production environments. For example, the biometric authorization system development tools 210 may be implemented during a training process such that a production environment would not be FIG. 3 illustrates a client device 300 configured to authenticate a user of the device, according to some embodiments. The client device 300 may include one or more processors 306 and a memory 308. The memory may store instructions that, when executed on or across the processors 306, cause the processors 306 to perform operations. The client device 300 may include an image capture device 302, a display device 304, and an authentication system 310. The authentication system 310 may be configured to authenticate the user of the client device 300 based on biometric data, according to some embodiments.

The authentication system 310 may obtain biometric data from the image capture device 302, according to some embodiments. For example, the image capture device 302 may include a camera configured to capture image data of the user of the client device 300. In response to a request to authenticate, the authentication system 310 may invoke the image capture device 302 to capture image data. The image data may be provided to the authentication system 310, according to some embodiments.

The authentication system 310 may include a liveness detection system 312 configured to determine whether the captured image data has been synthetically generated or synthesized, according to some embodiments. Based on a determination by the liveness detection system 312 that the captured image data is legitimately captured or that there is insufficient certainty to determine that the captured image data is synthetically generated, the captured image data may be provided to an image authentication system 314.

The image authentication system 314 may be configured to compare the captured image data against a stored image of the user, according to some embodiments. For example, the client device 300 may be configured to store reference images 374 of authorized users in data store 370. In some embodiments, the image authentication system 314 may retrieve the reference images 374 from the data store 370. In other embodiments, the image authentication system 314 may retrieve the reference images 374 from a cache maintained by the authentication system 310.

The display device 304 may be configured to display content to the user of the client device 300. In some embodiments, the display device 304 may be configured to project a light pattern onto the user of the client device 300. For example, the display device 304 may be configured to display the light pattern that includes a plurality of colors arranged in a pattern that would be visible on the user. The light pattern may be projected onto the user's face, according to some embodiments.

In some embodiments, the liveness detection system 312 may be configured to detect the light pattern as projected on the user in the captured image data. The liveness detection system 312 may be configured to determine whether the captured image data has been synthetically relit based on the projected light pattern. For example, the liveness detection system 312 may determine that the projected light pattern appears on the user in a way that is physically inconsistent with ambient lighting or a shape of the user's face. The liveness detection system 312 may determine that the captured image data has been synthetically generated based at least in part on the projected light pattern being relit by a computer vision algorithm.

Figure 4:
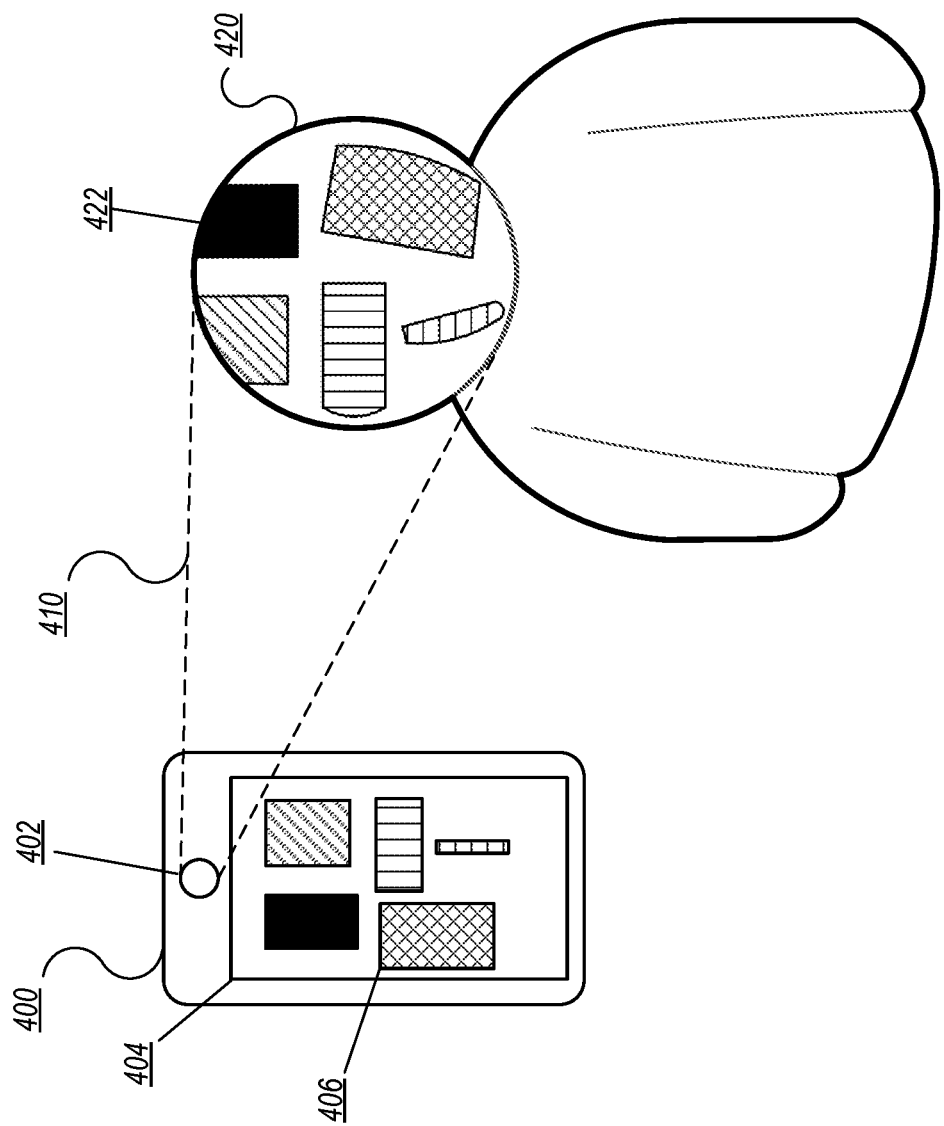
FIG. 4 illustrates an example implementation of a client device projecting a light pattern onto a user, according to some embodiments.

FIG. 4 illustrates an example implementation of a client device 400 projecting a light pattern 406 onto a user 420, according to some embodiments. The client device 400 may include an image capture device 402 and a display device 404, according to some embodiments.

The client device 400 may generate a light pattern 406 that includes a plurality of colors arranged in various orientations. In some embodiments, the client device 400 may include one or more processors and a memory that stores instructions that, when executed on or across the processors, cause the processors to generate the light pattern 406. The display device 404 may be configured to display the light pattern 406. As an illustrative example, FIG. 4 depicts that the light pattern 406 has multiple shapes that have respective fills to represent different colors. Other colors and orientations of the shapes may be possible while providing an optical indicator from the client device 400.

The light pattern 406 may be projected onto the user 420, according to some embodiments. The light pattern 406 may appear on the user 420 as a projected light pattern 422. As illustrated in FIG. 4, the projected light pattern 422 may be distorted or deformed based on various factors. For example, the projected light pattern 422 may be contoured over the shape of the user 420's face. As another example, the projected light pattern 422 may be shaded differently from the intended appearance of the light pattern 406 based on skin tone or ambient light in the environment in which the user 420 is present.

The client device 400 may capture image data of the user 420 and the projected light pattern 422 with the image capture device 402, according to some embodiments. For example, the image capture device 402 may include a camera that has a field of view to capture image data 410 of the user 420. The image capture device 402 may be configured to capture an image or vide of the user 420. The client device 400 may be configured to authenticate the user 420 according to the image data, as described herein.

The client device 400 may include a detection model configured to analyze the captured image data 410, according to some embodiments. The detection model may be configured to determine whether the projected light pattern 422 as depicted in the captured image data 410 is a real or fake projection of the light pattern 406. In some embodiments, the detection model may be applied to determine whether one or more features of the projected light pattern 422 represent an actual projection of the light pattern 406. For example, the projected light pattern 422 should have a different appearance due to the shape of the user 420's face and ambient lighting in the environment. The detection model may be configured to detect potential inconsistencies such as detection colors that would not tend to result from the light pattern 406, the ambient light and skin tone of the user 420.

The detection model may determine a synthesis score that indicates a likelihood that the projected light pattern 422 is an authentic representation of the light pattern 406 projected onto the user 420. If the synthesis score satisfies a synthesis threshold, then the captured image data 410 may be classified as not subject to relighting. Based on not being relit, the captured image data 410 may be considered authentic or real. The biometric authorization system may make an authorization determination to approve the attempt to be authorized based on the captured image data 410 being authentic.

Figure 5:
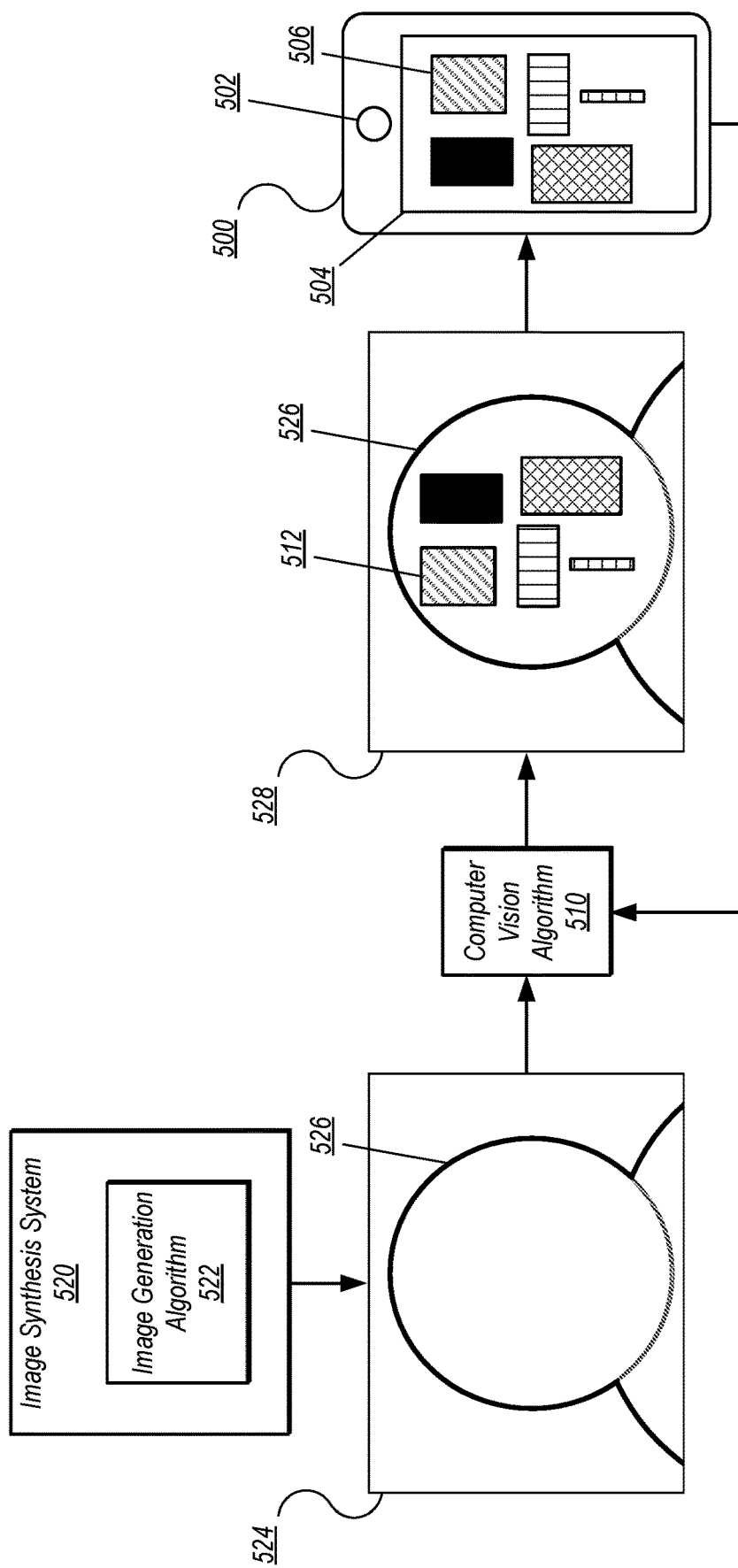
FIG. 5 illustrates a logical diagram of an attack protocol that includes synthetically generating image data depicting a user and applying a computer vision algorithm to relight the image data, according to some embodiments.

FIG. 5 illustrates a logical diagram of an attack protocol that includes synthetically generating image data 524 depicting a user 526 and applying a computer vision algorithm 510 to relight the image data 524, according to some embodiments. A client device 500 may receive the modified image data 528. An image synthesis system 520 may include an image generation algorithm 522 configured to generate synthesized images, such as the image data 524, according to some embodiments.

The image synthesis system 520 may generate the image data 524 in accordance with the image generation algorithm 522. The image generation algorithm 522 may include one or more machine learning networks, such as a generative adversarial network (GAN), configured to generate content. For example, the one or more machine learning networks may include machine learning models configured to generate images of targets, such as a user of client device 500. In some embodiments, the image generation algorithm 522 may obtain one or more images of a target to generate the synthesized image 524 with a synthesized representation of the user 526. The synthesized image 524 may be a frame of a plurality of frames of a synthesized video that includes the synthesized representation of the user 526.

The image synthesis system 520 may obtain captured image data that is captured by an image capture device 502 of the client device 500, according to some embodiments. The captured image data may be modified by the image synthesis system 520 to generate the synthesized image 524. For example, the captured image data may be a live video of a live user, and the captured image data may be modified to overlay the synthesized representation of the user 526 over the actual face of the live user such that the synthesized image 524 appears to have a different face than the live user.

The client device 500 may include a display device 504 configured to display a light pattern 506, according to some embodiments. The light pattern 506 may include an arrangement of a plurality of colors and shapes that are projected outward toward the live user. The computer vision algorithm 510 may be configured to detect the light pattern 506 and modify the light pattern 506 to be overlaid on the synthesized representation of the user 526, according to some embodiments. For example, the computer vision algorithm 510 may detect the light pattern 506 as projected on the live user and attempt to modify the light pattern 506 to fit on the synthesized representation of the user 526. The computer vision algorithm 510 may generate a synthesized light pattern 512 to be overlaid over the synthesized representation of the user 526 in modified image data 528. As illustrated in FIG. 5, the synthesized light pattern 512 may be an imperfect representation of the light pattern 506 because of imperfections of the computer vision algorithm 510. For example, the curvature or distortions of the synthesized light pattern 512 may not be a true-to-life representation of how the light pattern 506 would appear on the face of the live user.

The modified image data 528 may be injected into a biometric authorization system of the client device 500 as part of an attack protocol, according to some embodiments. In other embodiments, the modified image data 528 may replace the captured image data from the image capture device 502 in any process that detects the light pattern 506 as projected and captured by the image capture device 502. The attack protocol may be implemented as part of a training operation for the biometric authorization system. Alternatively, the attack protocol may be implemented by a malicious actor attempting to gain access to the client device 500.

The client device 500 may include a detection model configured to analyze the modified image data 528, according to some embodiments. The detection model may be configured to determine whether the projected light pattern 512 as depicted in the modified image data 528 is a real or fake projection of the light pattern 506. In some embodiments, the detection model may be applied to determine whether one or more features of the synthesized light pattern 512 represent an actual projection of the light pattern 506. For example, the synthesized light pattern 512 should have a different appearance due to the shape of the user 526's face and ambient lighting in the environment. The detection model may be configured to detect potential inconsistencies such as detection colors that would not tend to result from the light pattern 506, the ambient light and skin tone of the user 526.

The detection model may determine a synthesis score that indicates a likelihood that the synthesized light pattern 512 is an authentic representation of the light pattern 506 projected onto the user 526. If the synthesis score satisfies a synthesis threshold, then the modified image data 528 may be classified as being subject to relighting. Based on the relighting, the modified image data 528 may be considered inauthentic or fake. The biometric authorization system may make an authorization determination to reject the attempt to be authorized based on the modified image data 528 being fake.

Figure 6:
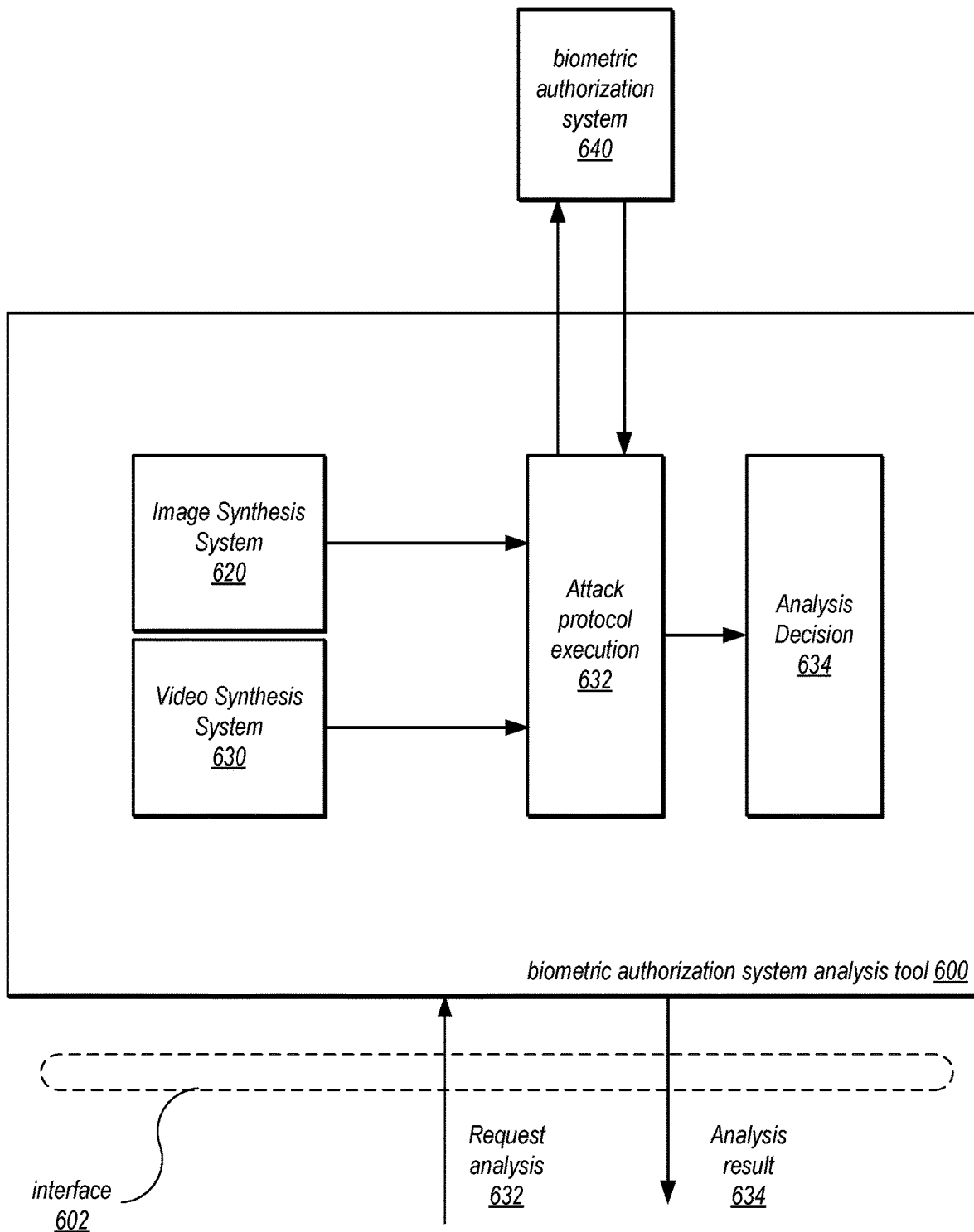
FIG. 6 illustrates a block diagram of a biometric authorization system analysis tool configured to perform an analysis of a biometric authorization system according to an attack protocol execution, according to some embodiments.

FIG. 6 illustrates a block diagram of a biometric authorization system analysis tool 600 configured to perform an analysis of a biometric authorization system 640 according to an attack protocol execution 632, according to some embodiments.

The biometric authorization system analysis tool 600 may receive a request for analysis 604 in accordance with an interface 602, according to some embodiments. The interface 602 may include an application programmatic interface (API) implemented by the biometric authorization system analysis tool 600 for clients to request analysis, according to some embodiments. In response to the request 604, the biometric authorization system analysis tool 600 may obtain a synthesized image from an image synthesis system 620 and a synthesized video from a video synthesis system 630, according to some embodiments. The synthesized image and the synthesized video may include synthetically generated image data depicting a person that is generated according to image or video generation algorithms.

The attack protocol execution 632 may be configured to execute one or more attack protocols based on the synthesized image, the synthesized video, or both, according to some embodiments. For example, an attack protocol may include injecting the synthesized image as a reference image of the biometric authorization system 640. As another example, an attack protocol may include injecting the synthesized image or the synthesized video as captured image data for the biometric authorization system 640.

The biometric authorization system 640 may return results of the attack protocols, according to some embodiments. For example, the biometric authorization system 640 may return an indication that the synthesized image or the synthesized video were rejected for being detected as synthetically generated images. As another example, the biometric authorization system 640 may return an indication that the synthesized image or the synthesized video have been matched with the reference image targeted by the synthesized image or the synthesized video.

Based on the results from the biometric authorization system 640, the biometric authorization system analysis tool 600 may generate an analysis decision 634, according to some embodiments. The analysis decision 634 may be determined according to metrics tracked with respect to the biometric authorization system 640. For example, the metrics may include one or more of a false acceptance rate ("FAR"), a false rejection rate ("FRR"), a false match rate ("FMR"), a false non-match rate ("FNMR"), or a combination thereof. In some embodiments, the analysis decision 634 may be based on the FRR satisfying a threshold rate value in view of the FAR being a specified value.

The biometric authorization system analysis tool 600 may generate an analysis result 606 based on the analysis decision 634, according to some embodiments. In some situations, the analysis decision 634 may indicate the metrics described herein, but the analysis result 606 may have a binary response that indicates whether the biometric authorization system 640 satisfies various requirements. In other embodiments, the analysis result 606 may include a verbose result that includes the metrics that formed the analysis decision 634. The biometric authorization system analysis tool 600 may send the analysis result 606 via the interface 602 in response to the request 604.

Figure 7:
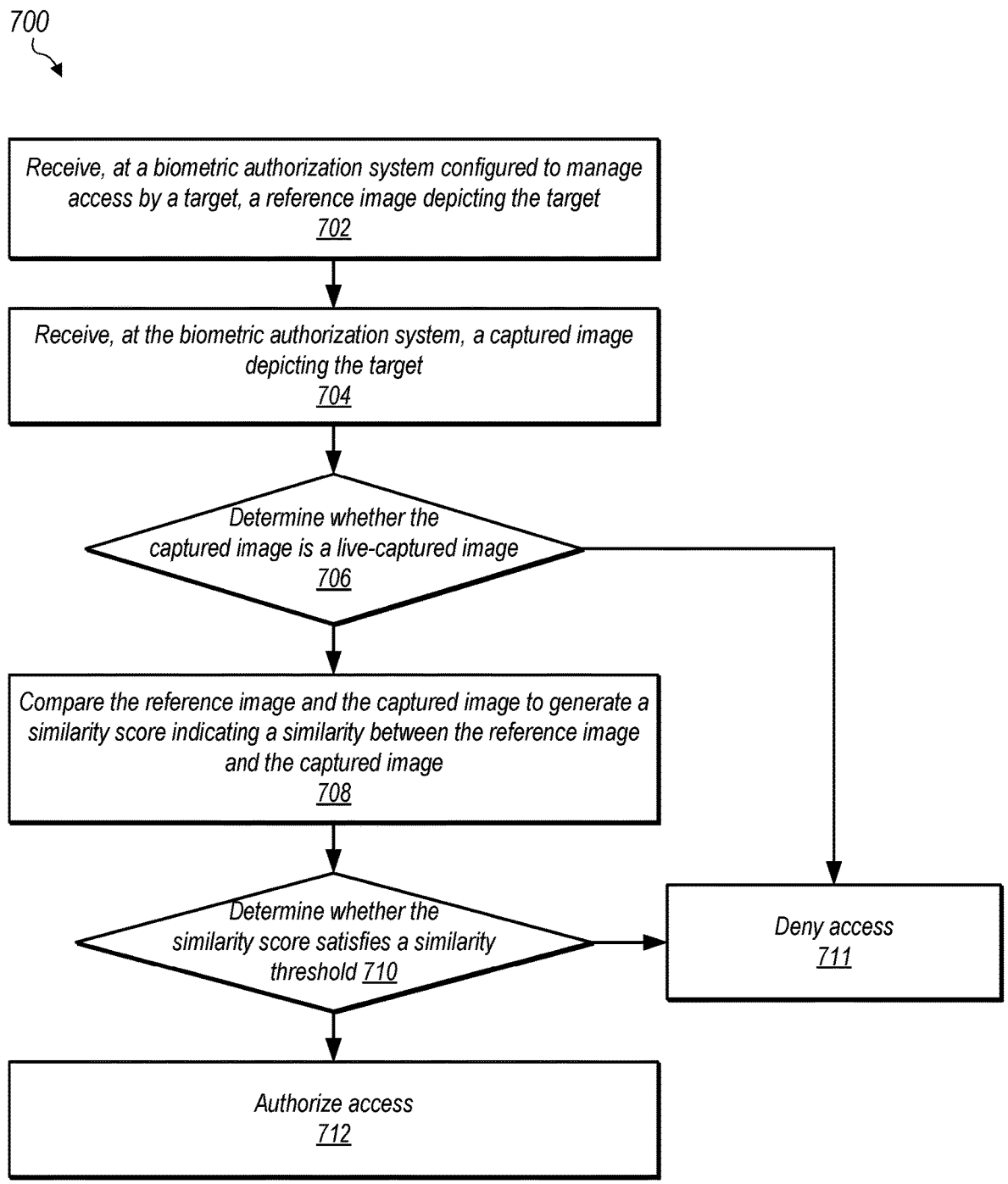
FIG. 7 illustrates a flowchart diagram for a method for biometric authorization, according to some embodiments.

FIG. 7 illustrates a flowchart diagram for a method 700 for biometric authorization, according to some embodiments. The method 700 may be implemented by u The method 700 may include receiving, at a biometric authorization system configured to manage access by a target, a reference image depicting the target, at 702. In some embodiments, the biometric authorization system may be configured to restrict access to a secured device. For example, the secured device may have restricted access for unregistered or unauthorized users. In other embodiments, the biometric authorization system may be configured to restrict access to a secured service. The reference image may be captured by an image capture device, such as a camera, and stored to a data store or secured data storage. The target may correspond to a user or an individual that may be authorized by the biometric authorization system.

The method 700 may include receiving, at the biometric authorization system, a captured image depicting the target, at 704. The biometric authorization system may initially expect the captured image to be sent from an image capture device. However, an attack protocol or malicious actor may inject the captured image such that the captured image was provided from another source, such as an image synthesis system.

The method 700 may include determining whether the captured image is a live-captured image, at 706. The biometric authorization system may include a liveness detection system configured to determine whether the captured image was synthetically generated. The liveness detection system may correspond to the liveness detection 112 of FIG. 1 or the liveness detection system 312 of FIG. 3, according to some embodiments. The liveness detection system may include one or more machine learning networks configured to detect altered image data to determine that the captured image is not a live-captured image. In some embodiments, the biometric authorization system may include a relighting detection model configured to detect whether an image has been subject to relighting. For example, an image that has been relit may be determined to be a fake image. Based on a determination that the captured image is synthesized, the method 700 may conclude by denying access, at 711.

Based on a determination that the captured image was not synthesized, the method 700 may include comparing the reference image and the captured image to generate a similarity score indicating a similarity between the reference image and the captured image, at 708. The biometric authorization system may include an image authentication system configured to determine similarity between two images, according to some embodiments. The image authentication system may correspond to the image authentication 114 of FIG. 1, the image authentication system 314 of FIG. 3, according to some embodiments. In some embodiments, the similarity score may be based on the similarity between the included targets in each of the reference image and the captured image.

The method 700 may include determining whether the similarity score satisfies a similarity threshold, at 710. The biometric authorization system may determine that the reference image and the captured image are sufficiently similar based on the similarity threshold. In some embodiments, the similarity threshold may be expressed as a percentage threshold such that the similarity score, when expressed as a percentage of likelihood of similarity, meets or exceeds the percentage threshold.

Based on a determination that the similarity score satisfies the similarity threshold, the method 700 may conclude by authorizing access, at 712. Based on a determination that the similarity score does not satisfy the similarity threshold, the method 700 may conclude by denying access, at 711.

Figure 8:
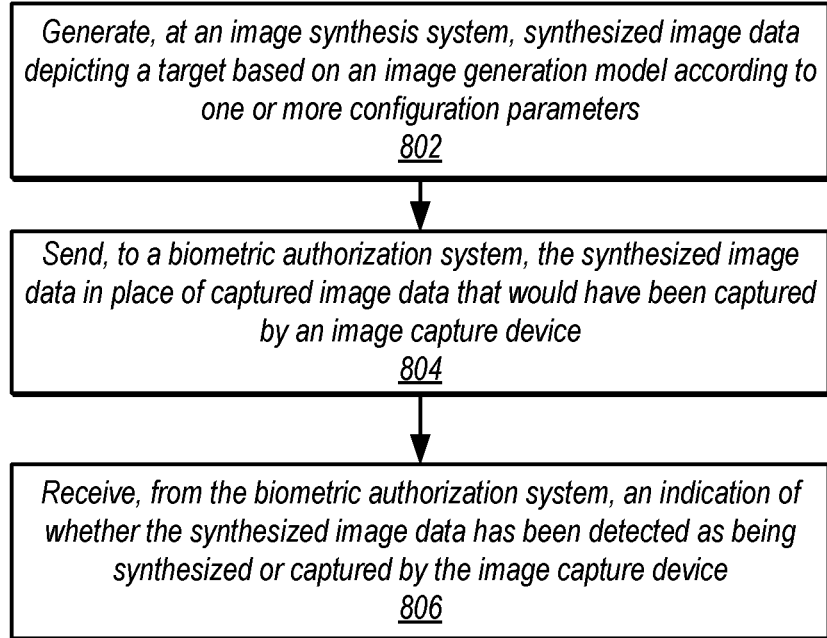
FIG. 8 illustrates a flowchart diagram for a method for implementing an attack protocol with a biometric authorization system, according to some embodiments.

FIG. 8 illustrates a flowchart diagram for a method 800 for implementing an attack protocol with a biometric authorization system, according to some embodiments. The method 800 may be implemented by the biometric authorization system 110 of FIG. 1, the biometric authorization system development tools 210 of FIG. 2, or the biometric authorization system analysis tool 600 of FIG. 6, according to some embodiments. The attack protocol may include one or more controlled attacks against the biometric authorization system to determine situations in which the biometric authorization system is insufficiently detecting synthesized data.

The method 800 may include generating, at an image synthesis system, synthesized image data depicting a target based on an image generation model according to one or more configuration parameters, at 802. The image synthesis system may correspond to the image synthesis system 120 of FIG. 1, the image synthesis system 222 of FIG. 2, the image synthesis system 520 of FIG. 5, or the image synthesis system 620 of FIG. 6, according to some embodiments. The image generation model may correspond to the image generation algorithm 122 of FIG. 1, according to some embodiments. The synthesized image data may include a synthesized image or a synthesized video depicting a synthesized representation of the target. In some embodiments the configuration parameters may define various The method 800 may include sending, to a biometric authorization system, the synthesized image data in place of captured image data that would have been captured by an image capture device, at 804. The biometric authorization system may correspond to the biometric authorization system 110 of FIG. 1, the biometric authorization system 206 of FIG. 2, the authentication system 310 of FIG. 3, the biometric authorization system 640 of FIG. 6, according to various embodiments. In some embodiments, the synthesized image data may be injected into a data stream between the image capture device and the biometric authorization system. The biometric authorization system may be configured to attempt to validate the synthesized image data as being synthetically generated or legitimately captured by the image capture device.

The method 800 may include receiving, from the biometric authorization system, an indication of whether the synthesized image data has been detected as being synthesized or captured by the image capture device, at 806. The biometric authorization system may provide an indication as to whether the underlying machine learning models have determined that the synthesized image data is likely to have been synthesized. In some embodiments, the indication may be expressed as a binary response. In other embodiments, the indication may be expressed as a numerical value that indicates a likelihood that any result is true.

Figure 9:
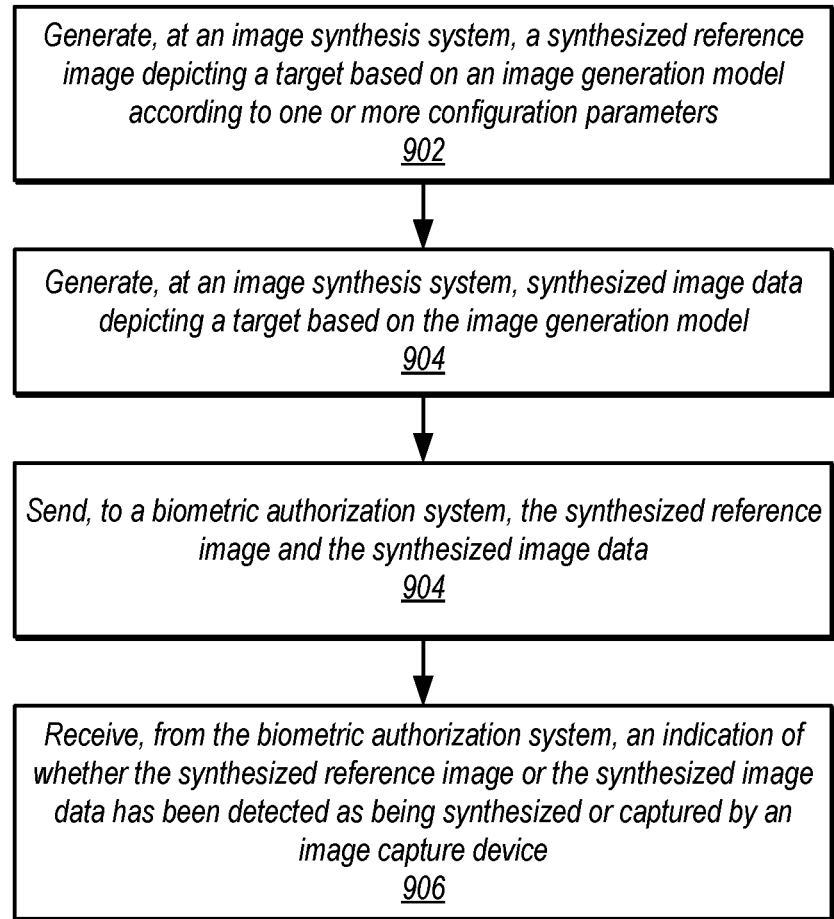
FIG. 9 illustrates a flowchart diagram of a method for implementing an attack protocol with a biometric authorization system, according to some embodiments.

FIG. 9 illustrates a flowchart diagram of a method 900 for implementing an attack protocol with a biometric authorization system, according to some embodiments. The method 800 may be implemented by the biometric authorization system 110 of FIG. 1, the biometric authorization system development tools 210 of FIG. 2, or the biometric authorization system analysis tool 600 of FIG. 6, according to some embodiments. The attack protocol may include one or more controlled attacks against the biometric authorization system to determine situations in which the biometric authorization system is insufficiently detecting synthesized data.

The method 900 may include generating, at an image synthesis system, a synthesized reference image depicting a target based on an image generation model according to one or more configuration parameters, at 902. The image synthesis system may correspond to the image synthesis system 120 of FIG. 1, the image synthesis system 222 of FIG. 2, the image synthesis system 520 of FIG. 5, or the image synthesis system 620 of FIG. 6, according to some embodiments. The synthesized reference image may be stored as a basis for an attempt to authorize the target at a later time.

The method 900 may include generating, at the image synthesis system, synthesized image data depicting the target based on the image generation model, at 904. In some embodiments, the synthesized image data may be different image data from the synthesized reference image. For example, the synthesized image data may have a different background or a different pose for the target.

The method 900 may include sending, to a biometric authorization system, the synthesized reference image and the synthesized image data, at 906. The biometric authorization system may correspond to the biometric authorization system 110 of FIG. 1, the biometric authorization system 206 of FIG. 2, the authentication system 310 of FIG. 3, the biometric authorization system 640 of FIG. 6, according to various embodiments. In some embodiments, the synthesized reference image and the synthesized image data may be sent at different points in time. For example, the synthesized reference image may be sent at a first point in time to wait until the attack protocol invokes the synthesized image data. In other embodiments, the synthesized reference image and the synthesized image data are sent concurrently to two different destinations within the biometric authorization system.

The method 900 may include receiving, from the biometric authorization system, an indication of whether the synthesized reference image or the synthesized image data has been detected as being synthesized or captured by an image capture device, at 908.

Figure 10:
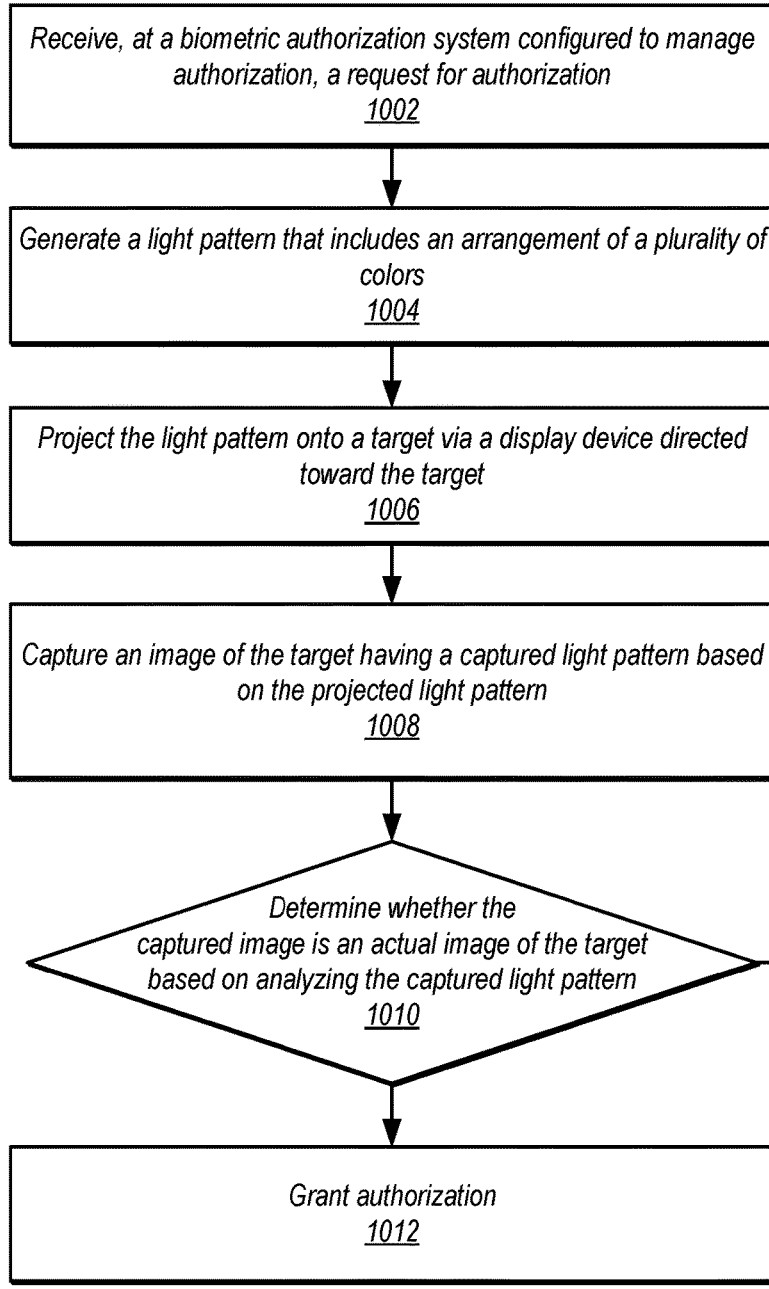
FIG. 10 illustrates a flowchart diagram of a method for validating a captured image based on a projected light pattern, according to some embodiments.

FIG. 10 illustrates a flowchart diagram of a method 1000 for validating a captured image based on a projected light pattern, according to some embodiments. The method 1000 may be implemented by the biometric authorization system 110 of FIG. 1, the biometric authorization system 206 of FIG. 2, the authentication system 310 of FIG. 3, the client device 400 of FIG. 4, the client device 500 of FIG. 5, or the biometric authorization system 640 of FIG. 6, according to various embodiments.

The method 1000 may include receiving, at a biometric authorization system configured to manage authorization, a request for authorization, at 1002. In some embodiments, the biometric authorization system may receive the request for authorization from the user of a device. The user may correspond to the user 420 of FIG. 4, according to some embodiments. The user may attempt to access the device causing the request for authorization to be sent to the biometric authorization system.

The method 1000 may include generating a light pattern that includes an arrangement of a plurality of colors, at 1004. The light pattern may correspond to the light pattern 406 of FIG. 4 or the light pattern 506 of FIG. 5, according to some embodiments. In some embodiments, the light pattern may be procedurally generated according to a random seed. The light pattern may be a fixed pattern that may be displayed while an image is captured of the user. Alternatively, the light pattern may be a dynamic pattern that is captured over time in a video.

The method 1000 may include projecting the light pattern onto a target via a display device directed toward the target, at 1006. The display device may correspond to the display device 404 of FIG. 4 or the display device 504 of FIG. 5, according to some embodiments. The display device may cause the light pattern to be projected onto the target such that the projected light pattern is visible on the target, such as the user's face. The method 1000 may include capturing an image of the target having a captured light pattern based on the projected light pattern, at 1008.

The method 1000 may include determining whether the captured image is an actual image of the target based on analyzing the captured light pattern, at 1010. In some embodiments, a relighting detection model may be applied to the captured image to determine whether one or more features of the captured light pattern are unnatural or have evidence of being relit in the captured image. In some situations, a computer vision algorithm may have generated the captured light pattern to be overlaid on a synthesized image of the target.

Based on a determination that the captured image is an actual image of the target, the method 1000 may conclude by granting authorization, at 1012. In some embodiments, additional security measures may be applied based on the captured image. For example, the captured image may be further analyzed with respect to a reference image. Based on a determination that the captured image is not an actual image of the target, the method 1000 may conclude by denying authorization, at 1011.

Figure 11:
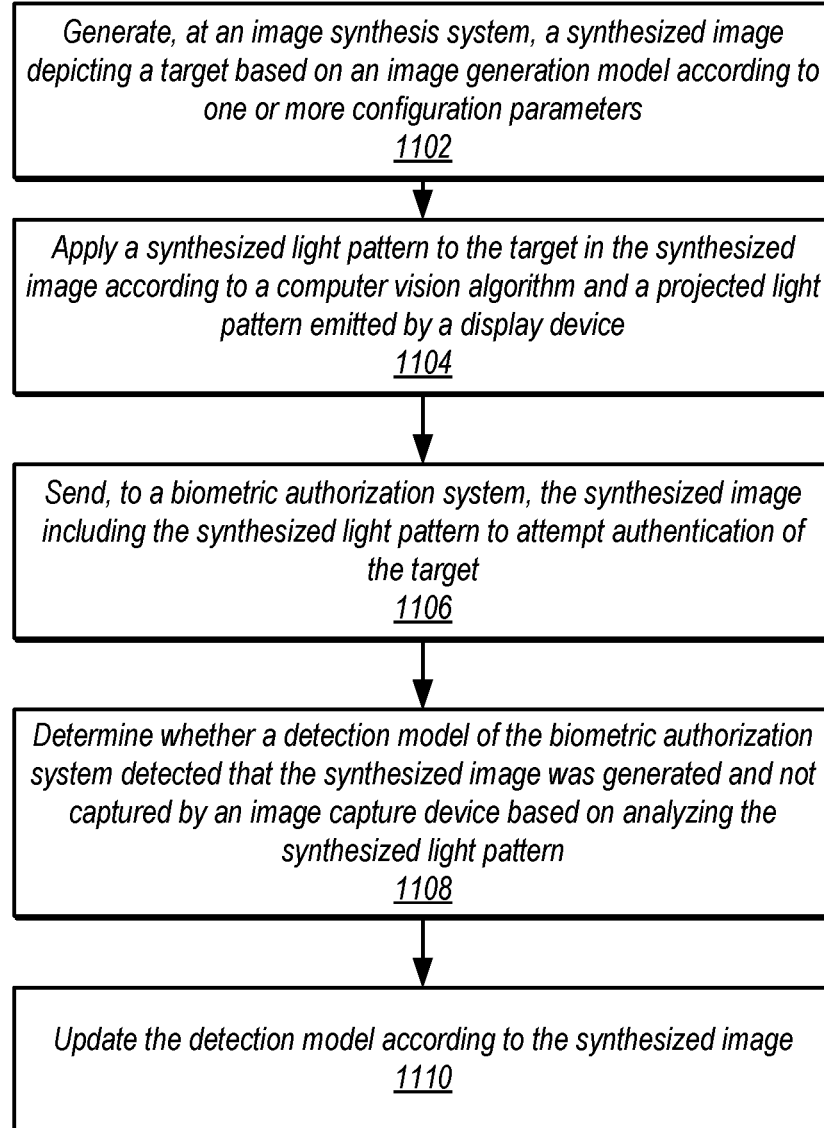
FIG. 11 illustrates a flowchart diagram of a method for training a detection model configured to detect whether an image has been synthesized based on a synthesized light pattern, according to some embodiments.

FIG. 11 illustrates a flowchart diagram of a method 1100 for training a detection model configured to detect whether an image has been synthesized based on a synthesized light pattern, according to some embodiments. The method 1100 may be implemented by the biometric authorization system 110 of FIG. 1, the biometric authorization system 206 of FIG. 2, the authentication system 310 of FIG. 3, the client device 400 of FIG. 4, the client device 500 of FIG. 5, or the biometric authorization system 640 of FIG. 6, according to various embodiments.

The method 1100 may include generating, at an image synthesis system, a synthesized image depicting a target based on an image generation model according to one or more configuration parameters, at 1102. The image synthesis system may correspond to the image synthesis system 120 of FIG. 1, the image synthesis system 222 of FIG. 2, the image synthesis system 520 of FIG. 5, or the image synthesis system 620 of FIG. 6, according to some embodiments. The image generation model may correspond to the image generation algorithm 122 of FIG. 1, according to some embodiments.

The method 1100 may include applying a synthesized light pattern to the target in the synthesized image according to a computer vision algorithm and a projected light pattern emitted by a display device, at 1104. The computer vision algorithm may correspond to the computer vision algorithm 510 of FIG. 5, according to some embodiments. The display device may correspond to the display device 404 of FIG. 4 or the display device 504 of FIG. 5, according to some embodiments. The computer vision algorithm may be configured to detect the projected light pattern by intercepting a live video feed from an image capture device. In another embodiment, the computer vision algorithm may be configured to obtain information indicating the light pattern from the device which generated the light pattern. For example, the computer vision algorithm may be implemented as part of a test tool deployed as part of the device integrated with the display device.

The method 1100 may include sending, to a biometric authorization system, the synthesized image including the synthesized light pattern to attempt authentication of the target, at 1106. The biometric authorization system may correspond to the biometric authorization system 110 of FIG. 1, the biometric authorization system 206 of FIG. 2, the authentication system 310 of FIG. 3, the biometric authorization system 640 of FIG. 6, according to various embodiments. The biometric authorization system may be configured to authorize the target based on the an image having a projected light pattern.

The method 1100 may include determining whether a detection model of the biometric authorization system detected that the synthesized image was generated and not captured by an image capture device based on analyzing the synthesized light pattern, at 1108. In some embodiments, the biometric authorization system may respond to the attempted authentication by returning results of the attempted authentication. If the biometric authorization system granted authentication, then the biometric authorization system has incorrectly classified the synthesized image as an authentically captured image. Thus, the detection model of the biometric authorization system needs additional training to prevent subsequent incorrect classifications.

The method 1100 may conclude by updating the detection model according to the synthesized image, at 1110. In other embodiments, one or more machine learning models may be updated according to the synthesized image. The one or more machine learning models may include a facial recognition model, a liveness detection model, or any other type of machine learning model used in the process. In some situations, the synthesized image may be incorrectly classified as a valid image. This situation would require that the detection model be made aware that the synthesized image is in fact synthesized. Updating the detection model may include identifying additional features in the synthesized image that are recognized as being synthesized. Updating may also include adjustment of weighting with respect to features that may indicate that an image is synthesized. In some embodiments, updating the detection model may include training the detection model.

Figure 12:
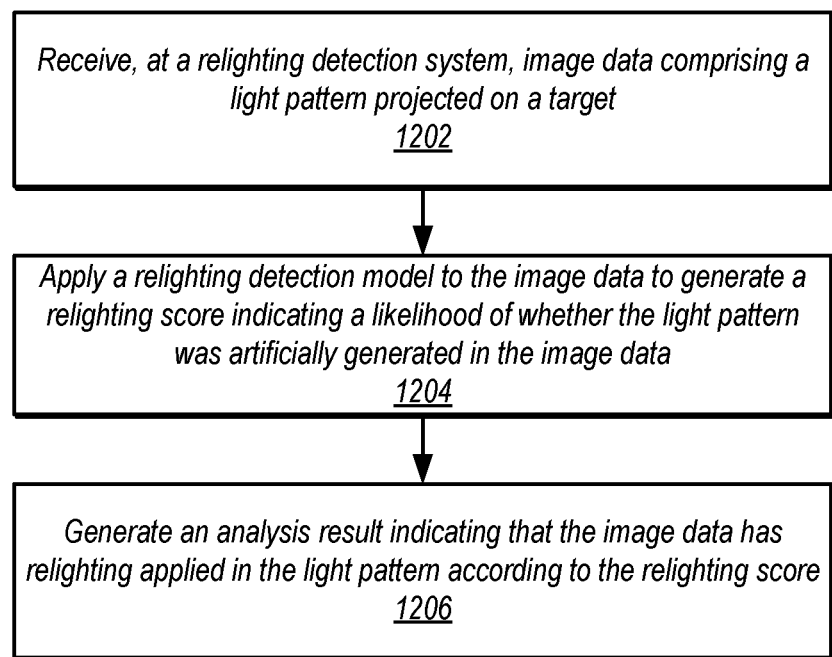
FIG. 12 is a flowchart diagram of a method for detecting that image data has been relit, according to some embodiments.

FIG. 12 is a flowchart diagram of a method 1200 for detecting that image data has been relit, according to some embodiments. The method 1200 may be implemented by the biometric authorization system 110 of FIG. 1, the biometric authorization system 206 of FIG. 2, the authentication system 310 of FIG. 3, the client device 400 of FIG. 4, the client device 500 of FIG. 5, or the biometric authorization system 640 of FIG. 6, according to various embodiments.

The method 1200 may include receiving, at a relighting detection system, image data comprising a light pattern projected on a target, at 1202. In some embodiments, the image data may be pre-processed to focus on portions of the image data that would contain the light pattern. The image data may be pre-processed to detect relevant portions of the image data that would be used during the authorization process. For example, the image data may be cropped to focus on a specific biometric of the target. The specific biometric may include the user's face, eyes, irises, palm, fingerprint, or any other biometric marker unique to the user. The image data may also be pre-processed to align or center the specific biometric in the image data.

The method 1200 may include applying a relighting detection model to the image data to generate a relighting score indicating a likelihood of whether the light pattern was artificially generated in the image data, at 1204. In some embodiments, the relighting detection model may be configured to detect when lighting is inconsistent with respect to the projected light pattern and ambient lighting conditions. For example, the lighting may be considered in consistent when the ambient light is cool white light, the projected light pattern is blue, and the light pattern in the image data is red. As another example, the lighting may be considered inconsistent when the shape of the projected light pattern would not align with the physical contours and shape of the user's face. In some embodiments, the relighting score may be expressed as a numerical value.

The method 1200 may include generating an analysis result indicating that the image data has relighting applied in the light pattern according to the relighting score, at 1206. The analysis result may be expressed as a binary or Boolean result. The analysis result may be determined based on a relighting threshold such that the image data is considered to be relit when the relighting score satisfies the relighting threshold.

The methods described herein may in various embodiments be implemented by any combination of hardware and software. For example, in one embodiment, the methods may be implemented by a computer system (e.g., a computer system as in FIG. 13) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 13:
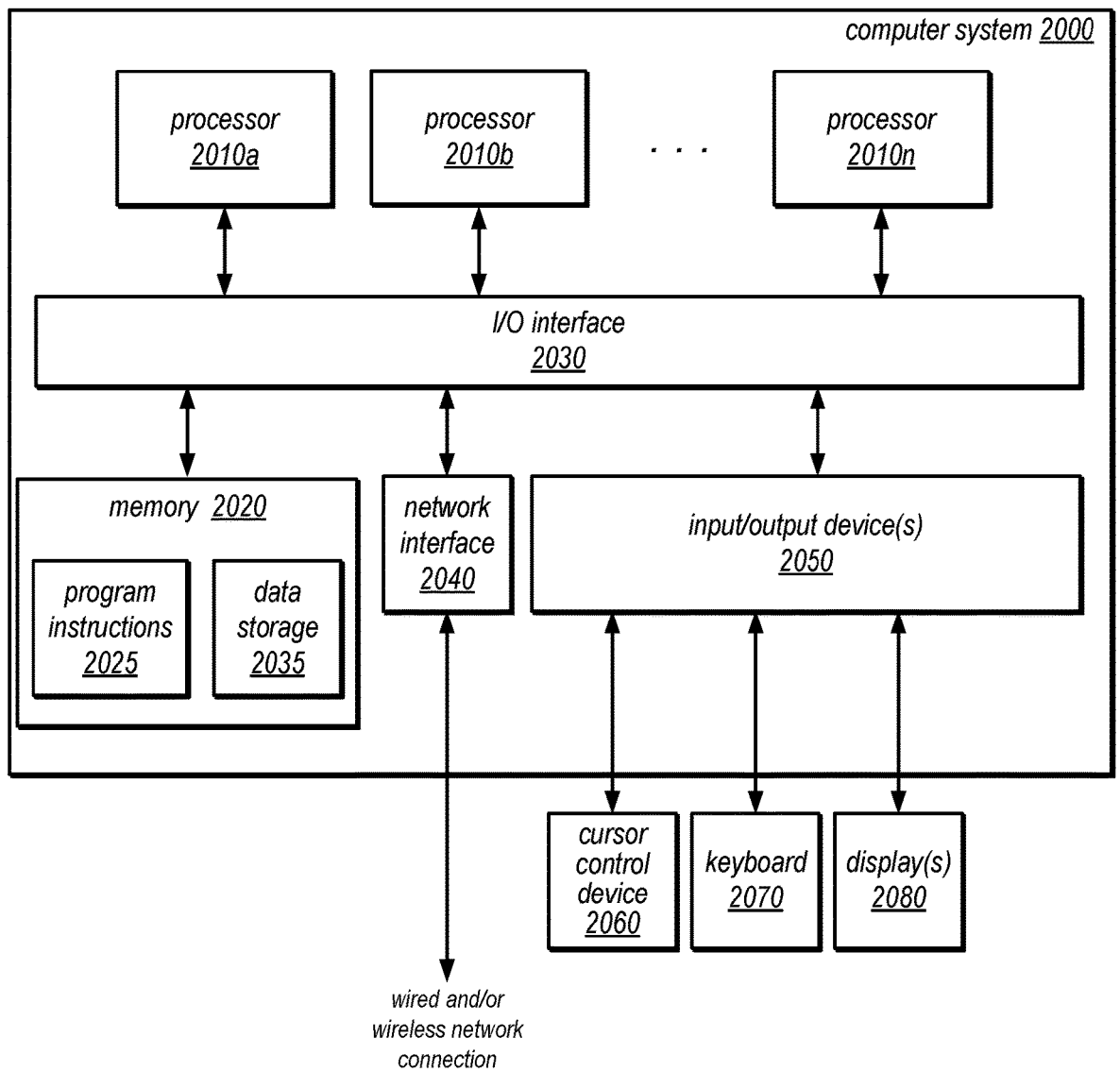
FIG. 13 illustrates a block diagram illustrating an example computer system that may be used in some embodiments.

Embodiments of privately sharing database data across provider network regions as described herein may be executed on one or more computer systems, which may interact with various other devices. One such computer system is illustrated by FIG. 13. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node, compute node, computing device, compute device, or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Display(s) 2080 may include standard computer monitor(s) and/or other display systems, technologies or devices. In at least some implementations, the input/output devices 2050 may also include a touch- or multi-touch enabled device such as a pad or tablet via which a user enters input via a stylus-type device and/or one or more digits. In some embodiments, it is contemplated that embodiments may be implemented using a single instance of computer system 2000, while in other embodiments multiple such systems, or multiple nodes making up computer system 2000, may host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, Advanced Micro Devices (AMD), and others.

System memory 2020 may store program instructions and/or data accessible by processor 2010. In various embodiments, system memory 2020 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a non-transitory, computer-readable storage medium may include storage media or memory media such as magnetic or optical media, e.g., disk or CD/DVD-ROM coupled to computer system 2000 via I/O interface 2030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 13, memory 2020 may include program instructions 2025, that implement the various methods and techniques as described herein, and data storage 2035, comprising various data accessible by program instructions 2025. In one embodiment, program instructions 2025 may include software elements of embodiments as described herein and as illustrated in the Figures. Data storage 2035 may include data that may be used in embodiments. In other embodiments, other or different software elements and data may be included.

Those skilled in the art will appreciate that computer system 2000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present embodiments may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the embodiments embrace all such modifications and changes and, accordingly, the above description to be regarded in an illustrative rather than a restrictive sense.

What is claimed is:

1. A system, comprising:
  a biometric authorization system configured to apply a facial recognition model to image data to make an authorization determination based on detection of synthesized image data and based on matching a reference image to the image data; one or more processors; and
  a memory configured to store instructions that, when executed on or across the one or more processors, cause the one or more processors to:
  execute one or more synthetic image data attack protocols to evaluate the biometric authorization system, wherein the one or more synthetic image data attack protocols further cause the one or more processors to:
    generate, according to one or more synthetic image data generation techniques, an evaluation set of image data comprising synthesized representations of a target; and
    send one or more authorization requests using the evaluation set of image data to the biometric authorization system; and
  generate an evaluation of the biometric authorization system for synthetic image data attack analysis based, at least in part, on respective responses to the one or more authorization requests received from the biometric authorization system.

2. The system of claim 1, wherein the memory further comprises instructions that, when executed on or across the one or more processors, cause the one or more processors to:
  update the one or more models according to the evaluation of the biometric authorization system indicating that the biometric authorization system incorrectly identified at least a portion of the evaluation set of image data.

3. The system of claim 1, wherein the memory further comprises instructions that, when executed on or across the one or more processors, cause the one or more processors to:
  analyze the respective responses according to similarity scores indicated in the respective responses, wherein the similarity scores indicate a similarity between the reference image and input image data.

4. The system of claim 1, wherein the evaluation set of image data comprises the synthesized image data that the biometric authorization system compares against the reference image.

5. The system of claim 4, wherein the evaluation set of image data further comprises a synthesized reference image that the biometric authorization system compares against the image data, including the synthesized image data.

6. A method, comprising:
  identifying a biometric authorization system for synthesized image data attack analysis, wherein the biometric authorization system analyzes reference image data to make an authorization determination;
  executing one or more synthetic image data attack protocols to evaluate the biometric authorization system, comprising:
    generating, according to one or more synthetic image data generation techniques, an evaluation set of image data; and
    sending one or more authorization requests using the evaluation set of image data to the biometric authorization system; and
  generating an evaluation of the biometric authorization system for synthetic image data attack analysis based, at least in part, on respective responses to the authorization requests received from the biometric authorization system.

7. The method of claim 6, further comprising:
  updating one or more models of the biometric authorization system according to the evaluation of the biometric authorization system indicating that the biometric authorization system incorrectly identified at least a portion of the evaluation set of image data or incorrectly matched the reference image data to at least the portion of the evaluation set of image data.

8. The method of claim 7, further comprising:
  recording metrics indicating a type of incorrect identification of at least the portion of the evaluation set of image data and a type of incorrect match of the reference image data and at least the portion of the evaluation set of image data.

9. The method of claim 6, further comprising:
  analyzing the respective responses according to similarity scores indicated in the respective responses, wherein the similarity scores indicate a similarity between reference image data and input image data.

10. The method of claim 6, wherein the evaluation set of image data comprises the synthesized image data that the biometric authorization system compares against the reference image.

11. The method of claim 10, wherein the evaluation set of image data further comprises a synthesized reference image that the biometric authorization system compares against the image data, including the synthesized image data.

12. The method of claim 6, wherein the evaluation set of image data comprises a synthesized video, and wherein the synthesized video comprises a plurality of synthesized images.

13. The method of claim 6, further comprising: generating the synthesized video based on applying temporal processing to the plurality of synthesized images.

14. One or more non-transitory computer-readable storage media storing instructions that, when executed on or across one or more processors, cause the one or more processors to:
  identify a biometric authorization system for synthesized image data attack analysis, wherein the biometric authorization system analyzes reference image data to make an authorization determination;
  execute one or more synthetic image data attack protocols to evaluate the biometric authorization system, the one or more synthetic image data attack protocols further cause the one or more processors to:

generate, according to one or more synthetic image data generation techniques, an evaluation set of image data; and send one or more authorization requests using the evaluation set of image data to the biometric authorization system; and generate an evaluation of the biometric authorization system for synthetic image data attack analysis based, at least in part, on respective responses to the authorization requests received from the biometric authorization system.

15. The one or more non-transitory computer-readable storage media of claim 14, further comprising instructions that, when executed on or across the one or more processors, cause the one or more processors to:

updating one or more models of the biometric authorization system according to the evaluation of the biometric authorization system indicating that the biometric authorization system incorrectly identified at least a portion of the evaluation set of image data or incorrectly matched the reference image data to at least the portion of the evaluation set of image data.

16. The one or more non-transitory computer-readable storage media of claim 15, further comprising instructions that, when executed on or across the one or more processors, cause the one or more processors to: record metrics indicating a type of incorrect identification of at least the portion of the evaluation set of image data and a type of incorrect match of the reference image data and at least the portion of the evaluation set of image data.

17. The one or more non-transitory computer-readable storage media of claim 14, further comprising instructions that, when executed on or across the one or more processors, cause the one or more processors to: analyze the respective responses according to similarity scores indicated in the respective responses, wherein the similarity scores indicate a similarity between reference image data and input image data.

18. The one or more non-transitory computer-readable storage media of claim 14, wherein the evaluation set of image data comprises the synthesized image data that the biometric authorization system compares against the reference image.

19. The one or more non-transitory computer-readable storage media of claim 18, wherein the evaluation set of image data further comprises a synthesized reference image that the biometric authorization system compares against the image data, including the synthesized image data.

20. The one or more non-transitory computer-readable storage media of claim 14, wherein the evaluation set of image data comprises a synthesized video, and wherein the synthesized video comprises a plurality of synthesized images.

* * * * *